United States Patent
Bentley et al.

(10) Patent No.: US 11,364,427 B2
(45) Date of Patent: Jun. 21, 2022

(54) TRAINING SYSTEM AND METHOD FOR CUING A JUMPER ON A JUMP OVER A CROSSBAR

(71) Applicants: Makenna Noel Bentley, Orange, CA (US); James Joseph Richardson, Temecula, CA (US)

(72) Inventors: Makenna Noel Bentley, Orange, CA (US); James Joseph Richardson, Temecula, CA (US)

(*) Notice: Subject to any disclaimer, the term of this patent is extended or adjusted under 35 U.S.C. 154(b) by 365 days.

(21) Appl. No.: 16/438,401

(22) Filed: Jun. 11, 2019

(65) Prior Publication Data
US 2019/0290985 A1    Sep. 26, 2019

Related U.S. Application Data

(62) Division of application No. 15/342,042, filed on Nov. 2, 2016, now Pat. No. 10,363,472.

(51) Int. Cl.
| | |
|---|---|
| *A63B 69/00* | (2006.01) |
| *G09B 19/00* | (2006.01) |
| *A63B 71/06* | (2006.01) |
| *A63B 5/02* | (2006.01) |

(52) U.S. Cl.
CPC ............ *A63B 69/00* (2013.01); *A63B 5/02* (2013.01); *A63B 71/0622* (2013.01); *G09B 19/0038* (2013.01); *A63B 2071/0625* (2013.01); *A63B 2220/20* (2013.01); *A63B 2220/30* (2013.01); *A63B 2220/805* (2013.01); *A63B 2220/833* (2013.01); *A63B 2244/081* (2013.01)

(58) Field of Classification Search
CPC ... G09B 19/0038; A63B 71/0622; A63B 5/02; A63B 15/12
See application file for complete search history.

(56) References Cited

U.S. PATENT DOCUMENTS

| | | | |
|---|---|---|---|
| 5,520,595 | A | 5/1996 | Lee |
| 5,760,389 | A | 6/1998 | Biasi |
| 6,181,647 | B1 | 1/2001 | Tipton |
| 6,308,565 | B1 | 10/2001 | French |
| 6,430,997 | B1 | 8/2002 | French |

(Continued)

FOREIGN PATENT DOCUMENTS

| | | |
|---|---|---|
| DE | 19803029646 A1 | 3/1982 |
| WO | WO 2007122408 A1 | 11/2007 |

*Primary Examiner* — Thomas J Hong
*Assistant Examiner* — Sadaruz Zaman
(74) *Attorney, Agent, or Firm* — Palomar Patent; Calif Teruo

(57) ABSTRACT

A training system for a jumper on a jump path over a crossbar predicts the jumper's flight path and cues the jumper if the flight path is too close to the crossbar or to take action if the jumper is predicted to strike the crossbar. The system includes a sensor viewing the jumper from a direction paralleling the crossbar and producing data points representative of the lowest edge of the jumper in the vicinity of the crossbar. A computer receiving the data points is programmed to determine therefrom the jumper's flight path, the jumper's forward speed, the location of a jumper's lower legs relative to the crossbar, an expected impact time of the lower legs with the crossbar, and a cuing time. A cuing device, such as a horn, cues the jumper to raise the lower legs so as to not impact the crossbar.

20 Claims, 6 Drawing Sheets

(56) References Cited

U.S. PATENT DOCUMENTS

| | | |
|---|---|---|
| 8,487,236 B2 | 7/2013 | Tagashira |
| 8,503,086 B2 | 8/2013 | French |
| 8,668,602 B1* | 3/2014 | Kieffaber .................. F41J 9/08 |
| | | 473/451 |
| 8,861,091 B2 | 10/2014 | French |
| 9,811,639 B2 | 11/2017 | Aragones |
| 2003/0064860 A1 | 4/2003 | Yamashita |
| 2003/0077556 A1* | 4/2003 | French ............... A63B 69/0053 |
| | | 434/258 |
| 2006/0084850 A1* | 4/2006 | Spinner ................ A61B 5/0002 |
| | | 600/301 |
| 2006/0101983 A1 | 5/2006 | Boxer |
| 2010/0015585 A1* | 1/2010 | Baker ....................... A61B 5/11 |
| | | 434/247 |
| 2012/0116550 A1* | 5/2012 | Hoffman ............ A63B 71/0622 |
| | | 700/91 |
| 2013/0280683 A1 | 10/2013 | Smith |
| 2014/0135955 A1 | 5/2014 | Burroughs |
| 2014/0228157 A1* | 8/2014 | Johnston .............. A63B 43/002 |
| | | 473/451 |
| 2015/0051009 A1* | 2/2015 | Davenport ............. A63B 53/04 |
| | | 473/223 |
| 2015/0057966 A1 | 2/2015 | Winter |
| 2015/0139502 A1 | 5/2015 | Holohan |
| 2016/0287462 A1 | 10/2016 | Oshima |
| 2016/0367847 A1 | 12/2016 | Antunes |
| 2017/0021257 A1* | 1/2017 | Olsen, II ................ G09B 19/06 |
| 2017/0050096 A1* | 2/2017 | Bentley .............. A63B 71/0622 |
| 2017/0118539 A1 | 4/2017 | Lokshin |
| 2017/0151484 A1 | 6/2017 | Reilly |
| 2017/0203154 A1* | 7/2017 | Solinsky ............... G01L 9/0073 |
| 2018/0140901 A1* | 5/2018 | Wiebe .................. A61B 5/0245 |
| 2018/0140902 A1* | 5/2018 | Wiebe .................... A61B 5/1118 |
| 2019/0168056 A1* | 6/2019 | Week .................. A63B 69/0028 |
| 2020/0298080 A1* | 9/2020 | Zhang ...................... G06T 7/74 |

\* cited by examiner

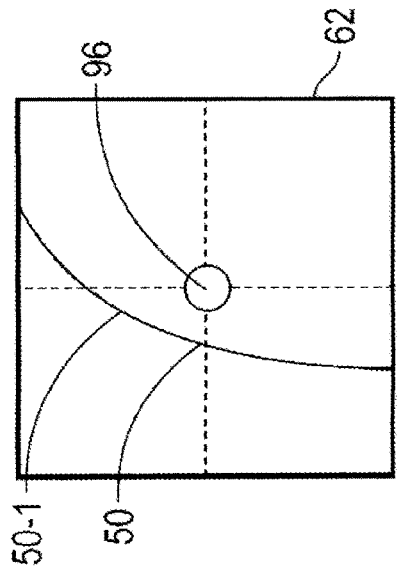
FIG. 3C
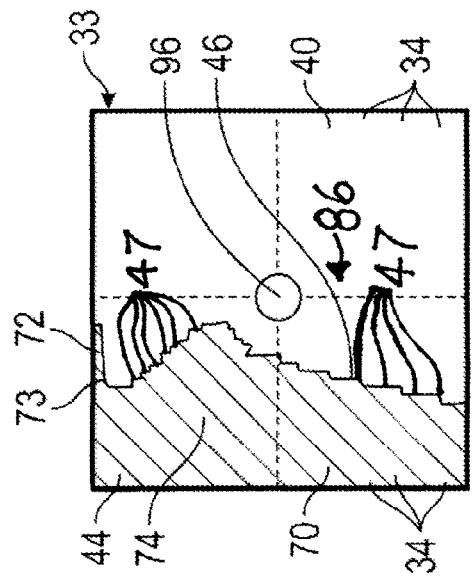
FIG. 3B
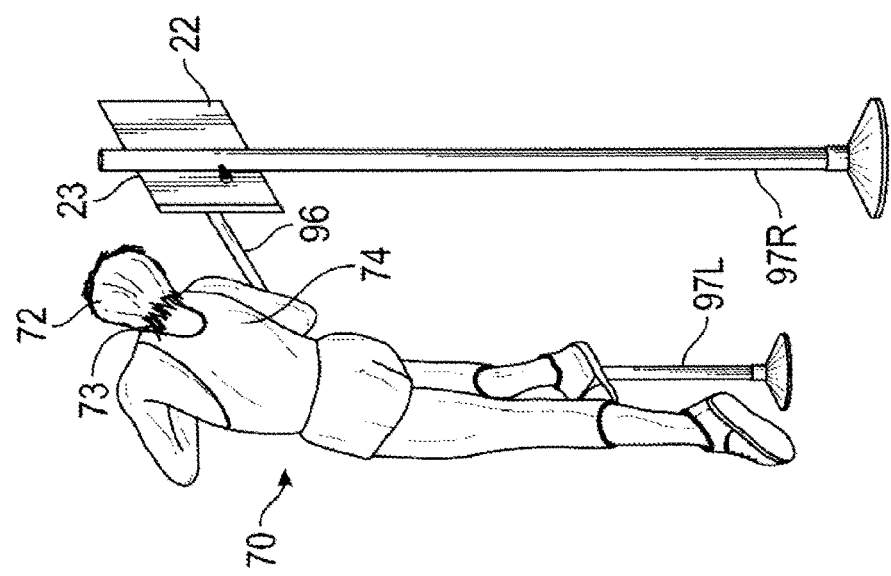
FIG. 3A
FIG. 3

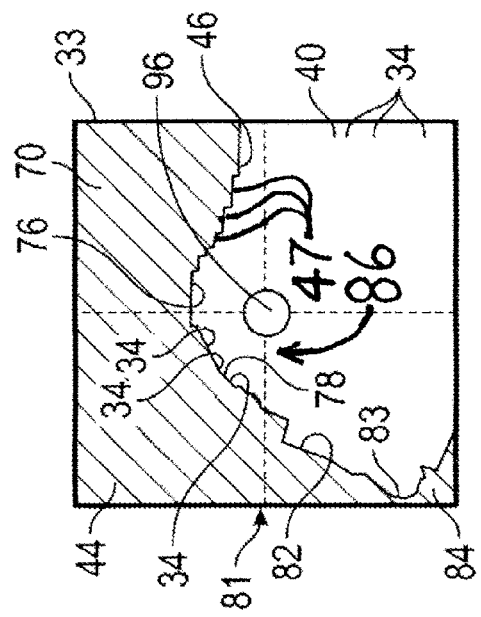
FIG. 4B
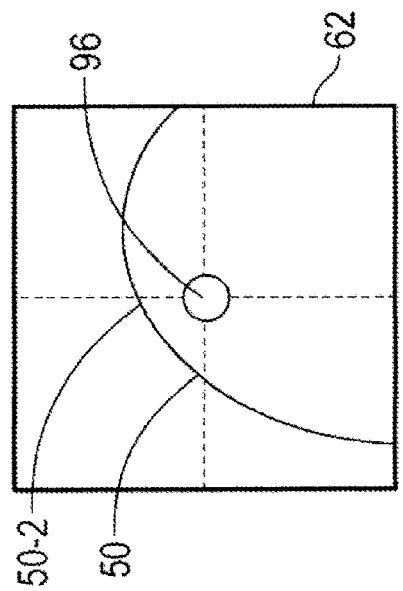
FIG. 4C
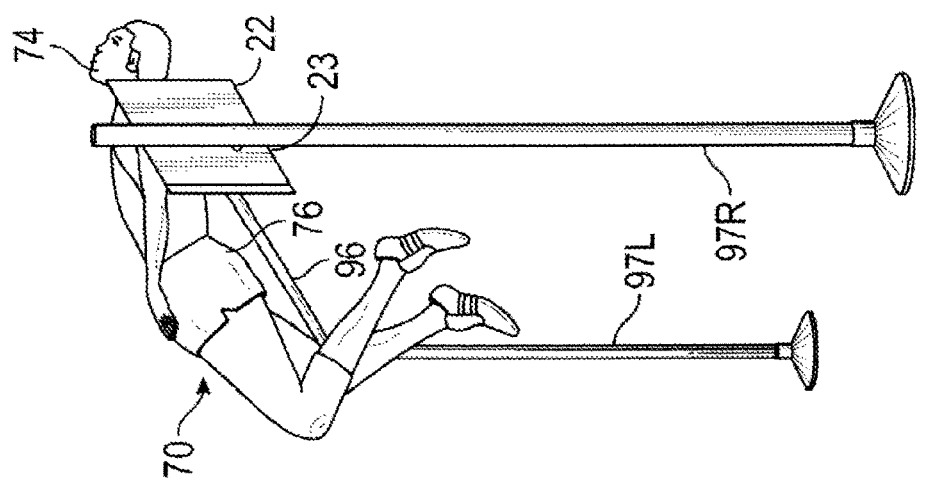
FIG. 4A
FIG. 4

TRAINING SYSTEM AND METHOD FOR CUING A JUMPER ON A JUMP OVER A CROSSBAR

CROSS-REFERENCE TO RELATED APPLICATIONS

This application is a division of and claims the benefit of U.S. patent application Ser. No. 15/342,042 filed Nov. 2, 2016; the disclosures of which are hereby expressly incorporated by reference.

FIELD OF THE INVENTION

This invention relates generally to training aids for athletic jumpers, and more specifically involves use of sensors for predicting the jumper's flight path and for cuing the jumper.

BACKGROUND OF THE INVENTION

Heretofore, various attempts have been made to use light beams of both visible and invisible wavelengths to aid in training jumpers. A training device for use in jumping practice by ice skaters is hitherto disclosed by Lee in U.S. Pat. No. 5,520,595. Lee's device comprises a single beam of electromagnetic wave suspended at an adjustable distance above a floor or an ice surface by a mechanism that generates electromagnetic wave energy and detects that same energy bounced back from a reflector plate placed a distance apart from the generator source. This beam of electromagnetic transmission suspended across the distance between the transceiver and reflector keeps an electric switch open and an electric alarm disabled or silent. Whenever the invisible beam is broken or cut by any obstruction, such as a skater's boot or leg, the alarm mechanism is energized and it will signal an interruption. The alarm signal enables an ice-skater to receive immediate feedback that the desired jump height was not achieved, so that a practicing skater may track step by step upward progress by constantly trying to keep the alarm off or silent. While Lee's device does provide immediate Pass or Fail feedback, it fails to provide quantitative information related to the maximum height achieved for any given jump, and further presumes the apex of each jump will consistently occur within the vertical plane of the electromagnetic beam.

In order to measure the height jumped during a high jump, a device employing a plurality of individual optical systems arranged parallel to and above the ground at incremental heights in a vertical plane is hitherto disclosed by Braun in German patent application number DE 3029646 A1. Braun's device does measure the height achieved by the high jump athlete within the specific vertical plane in which it is deployed (e.g. the vertical plane of a high jump crossbar), however it fails to provide other valuable feedback parameters of the high jump, such as the maximum height achieved throughout the entire flight path of the jump, the width of the jump and thus clearance of the crossbar in the fore and aft direction, and the location of the jump apex relative to the crossbar in the fore and aft direction. In order to determine these additional valuable parameters of the high jump, measurements within a volume and projected onto a two-axis planar array, perpendicular to both the vertical crossbar plane and the horizontal crossbar plane, are required.

An optoelectronic device comparable to Braun is hitherto disclosed by Biasi in U.S. Pat. No. 5,760,389 for use in the ground plane to measure the ground contact time and position of a body within a preset region, particularly adapted for the evaluation of hopping tests to determine the degree of athletic fitness of an individual. Biasi further discloses the use of two such devices arranged at right angles to one another to obtain the position on the plane where contact between the body and the surface occurs, and to measure the speed of a body which follows an unknown path within the plane of detection.

Similarly, a multi-optical axis photoelectric sensor hitherto disclosed by Tagashira in U.S. Pat. No. 8,487,236 detects entry of an object into a predetermined hazardous area by interruption of a planar "light curtain" consisting of a plurality of parallel optical beams. However, the Tagashira patent focuses primarily on the configurability and arrangement of system components "so as not to cause deterioration in workability and efficiency of wiring work" among components.

The devices disclosed by Braun, Biasi and Tagashira all deploy a plurality of optical sensors, either in a one-dimensional line, or in a two-dimensional arrangement of perpendicular but still co-planar lines, to determine the current state presence and/or location of an object within a two dimensional planar area of deployment. However none of these devices as disclosed is suited for adaptation to provide the valuable feedback parameters of a jump as previously described herein for a high jump, nor could they support the envisioned, advanced capabilities of a jump training system, such as flight path future state prediction, and prompting the jump athlete to execute specific time-critical actions, such as the kicking motion for a high jump athlete.

Additionally, a system and method for tracking and assessing movement skills in multidimensional space is disclosed by French in U.S. Pat. Nos. 6,308,565, 6,430,997, 8,503,086 and 8,861,091. French notes that, "Sports specific skills can be classified into two general conditions: 1) Skills involving control of the body independent from other players; and 2) Skills including reactions to other players in the sports activity." French describes a simulation environment within which a subject athlete would wear specific, required special clothing or markings/tags in order to be detected; would be presented with simulated opponent "avatars" projected into the simulation environment or shown on a separate display; and would be presented with contrived opponent actions at random times intended to illicit a sport-specific reactive response from the subject athlete. While the French system primarily focuses on "Skills including reactions to other players in the sports activity", it falls short in several key regards for "Skills involving control of the body independent from other players" such as in the Track and Field event of High Jump. The present invention's advantages over French for skills of body control include: instrumentation to provide skill assessment and training cues in the real world sports environment as opposed to a less representative simulated environment; and no requirement to wear any special clothing, markings, or tags to be detected, which could hinder the precise movements and quality of the athletic performance being assessed.

In USPTO publication number US20130280683A1, Smith describes the instrumentation of the real world sports environment for assessment and training in equestrian sports. Simulation is also considered, as in Smith's FIG. 8. Like French, Smith also requires special clothing, markings, or tags on both the horse and rider for detection of joint angles and relative positioning of horse and rider. Smith also is limited to recording video and other sensor data during a "ride" to then be assessed after the ride, to then provide instruction to the rider to attempt improvement on the next ride. Smith does not teach nor suggest detecting specific "trigger conditions" in real time during the ride to prompt or cue the rider to make a correction or complete a movement in real time as the ride is observed, as does the current invention.

Similarly, in USPTO publication number US2015-0139502A1, Holohan describes a method by which a player's basketball jump shot motion is recorded during one activity session then assessed thereafter by comparison to an ideal "reference skeleton" performing the same motions in order to identify a correction(s) to the athlete which may be the focus of the next activity session. Like Smith, Holohan does not teach nor suggest detecting specific "trigger conditions" in real time during the jump shot motion to prompt or cue the player to make a correction or complete a movement in real time as the jump shot is observed, as does the current invention.

Accordingly, the prior art in the field falls short of the advantages achieved by the current invention described herein.

SUMMARY OF THE INVENTION

The invention is a training system and method for cuing a jumper on a jump path over a crossbar and it generally comprises a sensor, a programmed computer, and a cuing device. The sensor senses the jumper along a direction paralleling the crossbar and produces data points representative of the lowest part of the jumper's outline or lowest edge of the silhouette of the jumper in the vicinity of the crossbar. The sensor is coupled to the computer which repeatedly samples the data points, and is programmed for calculating therefrom if a triggering event has occurred and, if so, produces a cuing signal. The cuing device, such as an audible device, such as a horn, is coupled to the computer and cues the jumper, such as with a noticeable sound, responsive to receipt of the cuing signal. In an exemplary embodiment, the sensor includes first and second opposed panels on opposite sides of the jump path near the crossbar; one panel having an array of light transmitters, and the other panel having a corresponding array of light detectors.

In a first embodiment of the invention, the computer is placed in "proximity mode" wherein it calculates from the data points an extrapolated parabolic flight path for the jumper and produces a cuing signal if the extrapolated flight path reaches a user-determined distance to the crossbar, i.e., the triggering event.

In a second embodiment, the computer is placed in "kick out" mode wherein it repeatedly samples the received data points during the jump and calculates therefrom: the jumper's forward speed, the location of a jumper's lower legs relative to the crossbar, an expected impact time of the lower legs with the crossbar, and, using a predetermined lead time, a cuing time for producing the cuing signal. The jumper should receive the cue from the cuing device in time to raise their lower legs to avoid contact with the crossbar. A user may change the lead time so as to tweak the calculated cuing time to achieve desired results.

The method of the "kick out" mode includes positioning the sensor, coupling the computer to the sensor for receiving the data points, programming the computer for repeated sampling of the received data points during the jump and for calculating therefrom: the jumper's forward speed; the location of a jumper's lower legs relative to the crossbar; an expected impact time of the lower legs with the crossbar; and, using a predetermined lead time, a cuing time for producing a cuing signal; and coupling the cuing device to the computer for receiving the cuing signal and for cuing the jumper to raise the lower legs so as to not impact the crossbar.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 3, consisting of three figures, includes a jumper initiating a jump and the system analysis thereof.

FIG. 3a is a perspective view of a high jumper initiating a jump.

FIG. 3b is an exemplary image in the light detector array of the jumper of FIG. 3a.

FIG. 3c is an exemplary estimated partial flight path parabola for the jumper of FIG. 3a, derived from the data of FIG. 3b.

FIG. 4, consisting of three figures, includes a jumper in mid-jump and the system analysis thereof.

FIG. 4a is a perspective view of a high jumper in mid-jump with upper body over the bar.

FIG. 4b is an exemplary image in the light detector array of the jumper of FIG. 4a.

FIG. 4c is an exemplary estimated flight path parabola for the jumper of FIG. 4a derived from the data of FIG. 4b.

FIG. 5a is a perspective view of a high jumper arched over the bar.

FIG. 5b is an exemplary image in the light detector array of the jumper of FIG. 5a.

FIG. 5c is an exemplary estimated flight path parabola for the jumper of FIG. 5a derived from the data of FIG. 5b.

DETAILED DESCRIPTION OF THE INVENTION

Figure 1:
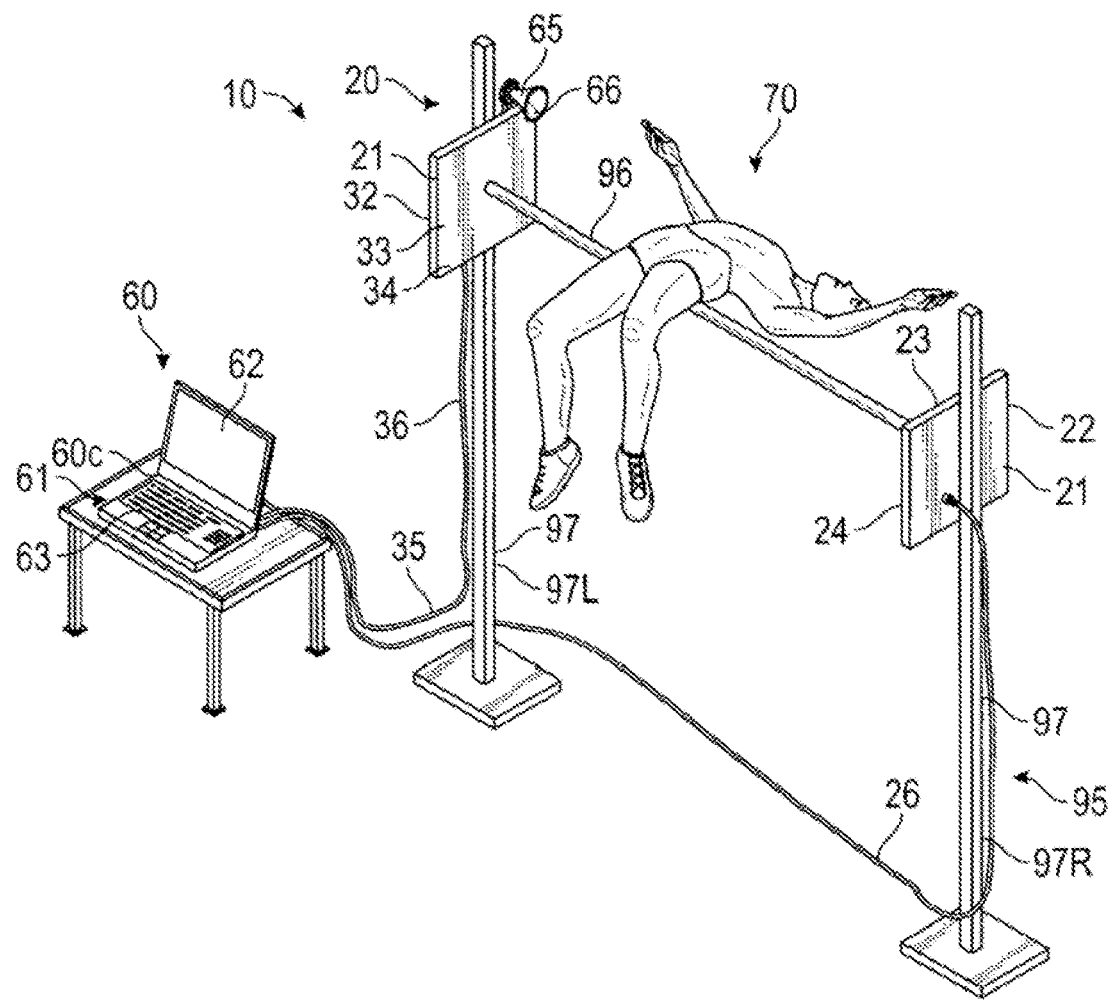
FIG. 1 is a perspective view of an exemplary embodiment of the training system of the invention in use.

FIG. 1 is a perspective view of an exemplary embodiment of the training system, denoted generally as 10, of the invention in position to monitor the progress of a high jumper, denoted generally as 70, on a jump path jumping over a high jump, denoted generally as 95, specifically over a crossbar, such as bar 96, of high jump 95. High jump 95 also includes a pair of spaced standards 97, such as left and right standards 97L, 97R, adapted for supporting bar 96 therebetween at a desired height. Jumper 70 is shown in a layout position near mid-jump. The jump path is the path that jumper 70 takes while airborne.

Figure 2:
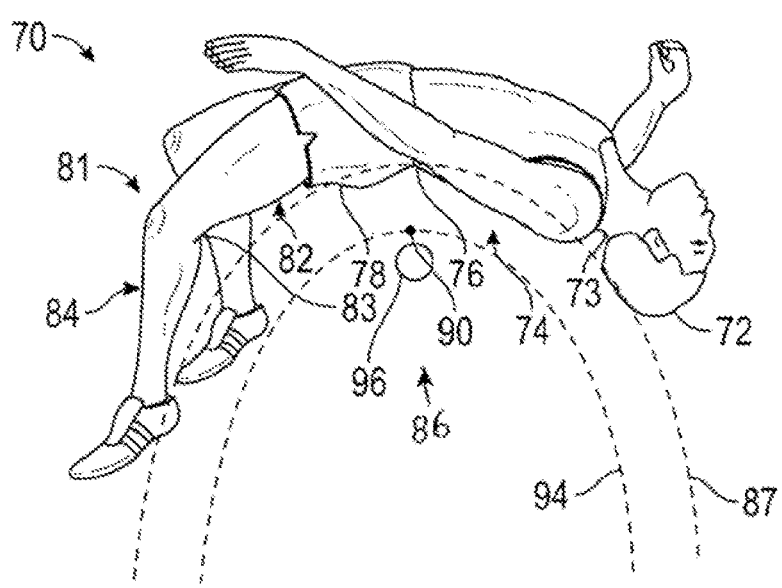
FIG. 2 is a side view of a high jumper's body and center of gravity parabola at the arc or layout position near mid-jump.

Looking for a moment at FIG. 2, there is a side view depiction of jumper 70 in the early layout position above bar 96. The jumper's momentary center of gravity 90 is below jumper 70 and follows a parabolic flight path 94. The jumper's lumbar spine 76 is directly above bar 96 and his head 72, neck 73 and upper back 74 are past bar 96. Buttocks 78 are approaching bar 96. Legs 81 include hamstrings 82, popliteal fossa or knee pits 83, and lower legs 84. With jumper 70 at this position, jumper's dorsal side, denoted generally as 86, approximates a parabola 87 that is above and parallel to the idealized parabolic flight path 94 of his center of gravity 90.

For high jumping and other athletic jumps to be monitored, once jumper 70 leaves the ground, it may be assumed that gravity is the only force acting on the airborne jumper 70, i.e., wind resistance and other external forces are negligible. Thus, center of gravity 90 generally follows an idealized parabolic flight path 94 having a vertical axis of symmetry. Parabolic flight path 94 may be represented by a second order quadratic equation. Training system 10 uses these principles to predict the flight path 94 of jumper 70.

Returning to FIG. 1, training system 10 comprises a sensor, denoted generally as 20, for detecting, along a viewing direction paralleling bar 96, the lowest edge of jumper 70 in the vicinity of bar 96, a computer 60, such as portable computer 60C, coupled to sensor 20, and a cuing device 65 coupled to computer 60 and located near sensor 20.

In the exemplary embodiment shown, sensor 20 includes first and second opposed panels 21, such as right and left panels 22, 32, on opposite sides of the jump path, such as being mounted upon left and right standards 97L, 97R respectively and centered on bar 96. Each panel 21 includes an array 23, 33 respectively. One panel, such as panel 22, includes a transmitting array 23, not seen, of light transmitters 24 spaced horizontally and vertically at intervals on the face of panel 22 facing panel 32. Intervals of about one quarter inch are contemplated, but other intervals, particularly smaller intervals, may be suitable. With a light transmitter spacing of one quarter inch, a transmitting array 23 of twelve inches tall by twelve inches wide contains 48 rows by 48 columns of light transmitters 24. The opposing panel 21, such as left panel 32 includes a corresponding detection array 33 of light detectors 34, each detector 34 for detecting light transmitted across the jump path from its corresponding transmitter 24. Transmitting and detecting arrays 23, 33 may be activated by a controlling circuit which may employ shift registers and active multiplexing as admirably taught by Biasi and/or transmission of a timing signal between transmitter and receiver as admirably taught by Tagashira to determine if the line of sight between each parallel pair 23, 33 is obstructed and the precise time at which such obstruction is detected.

The term "light" refers to electromagnetic radiation of any wavelength, whether visible or not. Although the exemplary sensor 20 includes a transmitting array 23 and detecting array 33 on opposite sides of the jump path, other configurations could be used. For example, both arrays 23, 33 could be on one panel 21, and the opposing panel could be a reflector, such as a mirror, that returns light received from the transmitting array 23 to the detecting array 33. Also, sensor 20 could comprise a single panel 21 using a method, such as high frequency radar, to detect the lowest edge of jumper 70 in the vicinity of bar 96.

Transmitting array 23 receives power from computer 60 such as through cable 26. Alternatively, transmitting array 23 could be powered by any electrical source or be self powered, such as with batteries. Coupling means 35 for coupling computer 60 to sensor 20 includes a detector cable 36 between computer 60 and detecting array 33 for receiving the data output of detecting array 33. Other coupling means 35, such as a wireless data coupling, as is well known, could be used. Detector cable 36 also supplies power to detecting array 33. Alternatively, detecting array 33 could be powered by any electrical source or be self powered, such as with batteries.

Computer 60 may be any suitable computing device capable of executing the below-described program. Preferably, computer 60 includes an interactive user display interface 61 including a display 62 for user observation and playback and a touchscreen or keyboard 63 for receiving user input.

Cuing device 65, such as horn 66, receives a cuing signal from computer 60 and emits a cuing signal, such as an audible signal, to cue jumper 70 or a coach that a triggering event has been detected by the computer as will be more fully explained hereinafter. Horn 65 is shown mounted on a panel 21, such as left panel 32, and receives power and the cuing signal via cable 36. Horn 66 could be powered by any suitable means, and the cuing signal could be sent wirelessly. Cuing device 65 could be any device capable of informing jumper 70 to take some action. Possible cuing devices include speakers integral with computer 60, an audio speaker, a light, or a haptic transducer or shocker worn by jumper 70.

Figure 5:
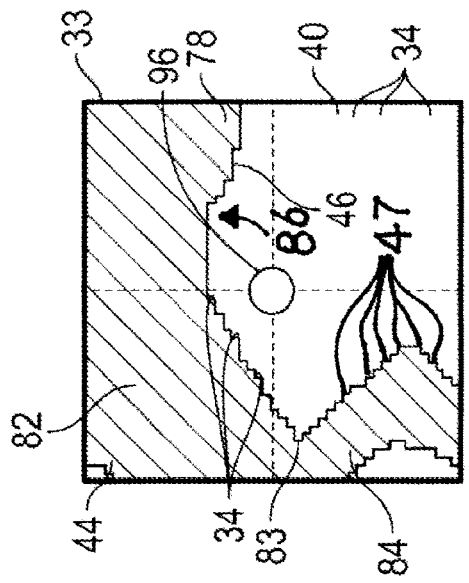
FIG. 5, consisting of three figures, includes a jumper arched over the bar and the system analysis thereof.
Figure 5:
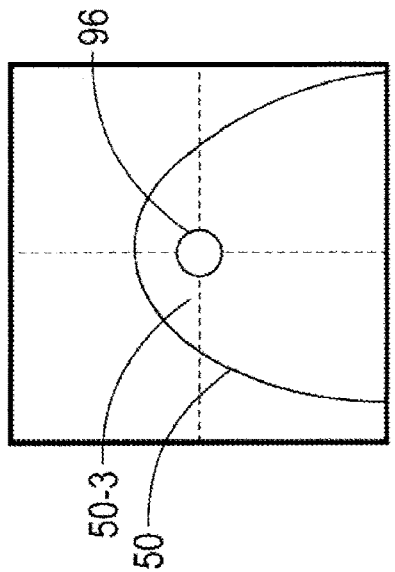
Figure 5:
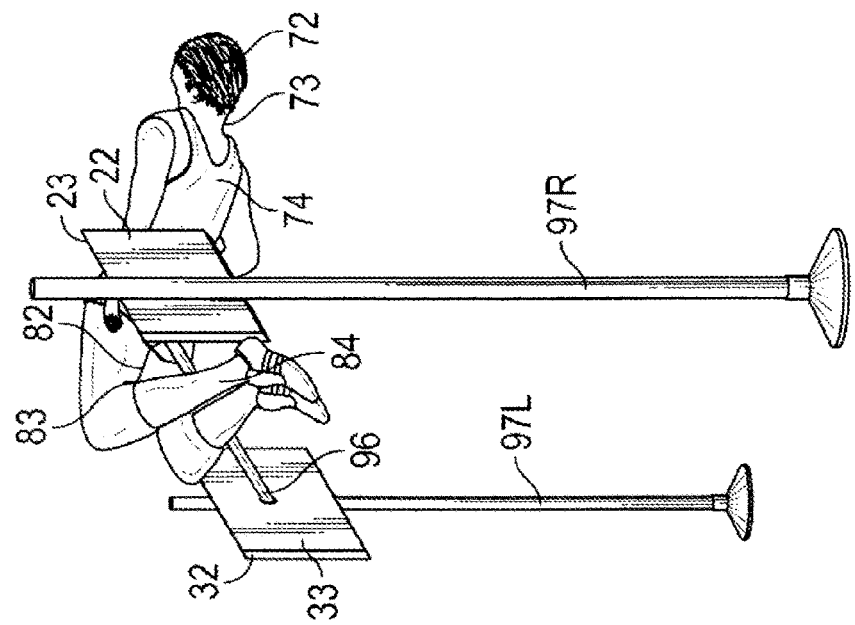

FIGS. 3-5 illustrate a sequence of three exemplary data sampling times whereby system 10 estimates the flight path 94 of jumper 70 during a jump. The exemplary sampling time spacings, shown, are intended to best illustrate the principle of the invention and are much larger than actual data sampling times. Actual data sampling time is preferably in the range of 10 Hertz or greater. It may be as fast as computer 60 can conduct the necessary calculations.

FIG. 3a, at sample time #1, is a perspective side view of jumper 70 initiating a jump. Jumper's head 72, neck 73, and upper back 74 are in the vicinity of bar 96 and partially in the sensing area of sensor 20. FIG. 3b is a representative image of the data collected by detecting array 33 of jumper 70 of FIG. 3a. The light receiving area 40 represents light detectors 34 (seen in FIG. 1) not obstructed by jumper 70. The obstructed area 44 represents light detectors 34 obstructed by jumper 70. The jumper's head 72, neck 73, and upper back 74 are silhouetted. Light detectors 34 bordering light receiving area 40 produce data points 47 representative of the lowest edge 46, e.g., the lowest edge of the silhouette or the lowest obstructed points facing bar 96 of jumper 70 in the viewing area.

An estimated flight parabola 50 is derived from the data points 47 representative of the lowest edge 46. FIG. 3c is a display, such as on computer display 62, of an exemplary estimated flight parabola 50-1 for jumper 70 of sample time #1 of FIG. 3. Computer 60 is programmed to receive data points 47 representative of edge 46 and to derive therefrom the estimated flight parabola 50-1 of jumper 70 of sample #1. Parabola 50-1 is derived from data points 47 representing edge 46 by means well known, such as by using a least squares fit algorithm.

For each sampling, the detecting array's 33 data, e.g., FIG. 3b, and the derived parabola 50-1 may be shown on computer display 62 and provide valuable real time feedback to a coach. Additionally, all of the data taken during a jump is recorded by computer 60 and can be displayed later on display 62 and at different speeds and forward or backward for analysis by a coach or jumper 70.

Additionally, computer 60 is programmed to have a "proximity" mode wherein, if parabola 50 is within a prescribed distance to bar 96, a proximity signal is produced whereby cuing device 65 produces a proximity signal to alert coach or jumper 70. The beginning proximity distance is either preprogrammed or set manually, e.g., by user selection of specific distance via interactive user display interface 61, as illustrated in FIG. 1, and may be changed to achieve the desired jump success from observed jump performance.

In one preferred embodiment of the present invention, the data representing edge 46 are processed with a weighted least squares curve fit (WLSFit) algorithm using weighting factors for both distance and time, as follows:

$W(i)=W_D(i)*W_t(i)$; The weight for each point "i" includes a distance factor (D) and a time factor (t);

$W_D(i)=1/SQRT(x_i^2+y_i^2)$; The distance factor is the inverse of the distance to the center of bar; and $W_t(i)=(1/2)^{[(t-ti)/\tau]}$; wherein, the time factor relies on the "time to half weight" time constant, $\tau$.

In one example embodiment, the WLSFit parabolic output is recomputed at a 10 Hz rate using a time constant to half weight of 0.5 seconds. The WLSFit output is a parabolic equation which closely approximates the flight path of jumper's lowest edge 46.

As the jump progresses and more points of edges 46, e.g., from FIGS. 4 and 5, are available, parabola 50 will become more refined and complete.

FIGS. 4a-4c are similar to FIGS. 3a-3c, but for a sample time #2. FIG. 4a is a perspective side view of a jumper 70 in mid-jump with lumbar spine 76 over crossbar 96 and upper back 74 past bar 96 but still partially in the viewing area of sensor 20. FIG. 4b is a representative image of the data collected by detecting array 33 of jumper 70 of FIG. 4a. The light receiving area 40 represents light detectors 34 not obstructed by jumper 70. The obstructed area 44 represents light detectors 34 obstructed by jumper 70. Jumper's lumbar spine 76 is over bar 96 and buttocks 78 are approaching bar 96. Legs 81 including hamstrings 82, knee pits 83 and lower legs 84 are partially in the viewing area of sensor 20. Light detectors 34 bordering light receiving area 40 produce data points 47 representative of the lowest edge 46, e.g., the lowest edge of the silhouette or the lowest obstructed points, of jumper 70 in the viewing area of sensor 20. FIG. 4c is a display, such as on computer display 62, showing an exemplary estimated flight parabola 50-2 for sample #2 of jumper 70 of FIG. 4a derived from the data points 47 of edge 46 of jumper 70 of FIG. 4b and from the weighted data from earlier sample(s), e.g., FIG. 3b.

FIGS. 5a-5c are similar to FIGS. 4a-4c, but for a sample time #3. FIG. 5a is a perspective view of jumper 70 arched over bar 96. In the viewing area of sensor 20, buttocks 78 have passed over bar 96, hamstrings 82 are above bar 96, and lower legs 84 are approaching bar 96. FIG. 5b is a representative image of the data collected by detecting array 33 of jumper 70 of FIG. 5a. The light receiving area 40 represents light detectors 34 not obstructed by jumper 70. The obstructed area 44 represents light detectors 34 obstructed by jumper 70. Light detectors 34 bordering light receiving area 40 produce data points 47 representative of the lowest edge 46, e.g., the lowest edge of the silhouette or the lowest obstructed points, of jumper 70 in the viewing area of sensor 20. On lowest edge 46, buttocks 78, hamstrings 82, and lower legs 84 are identifiable. FIG. 5c is an exemplary estimated flight parabola 50-3 for sample #3 of jumper 70 of FIG. 5a derived from the data points 47 of edge 46 of jumper 70 of FIG. 5b and from weighted data from earlier samples, e.g., from FIG. 3b and FIG. 4b.

Figure 6:
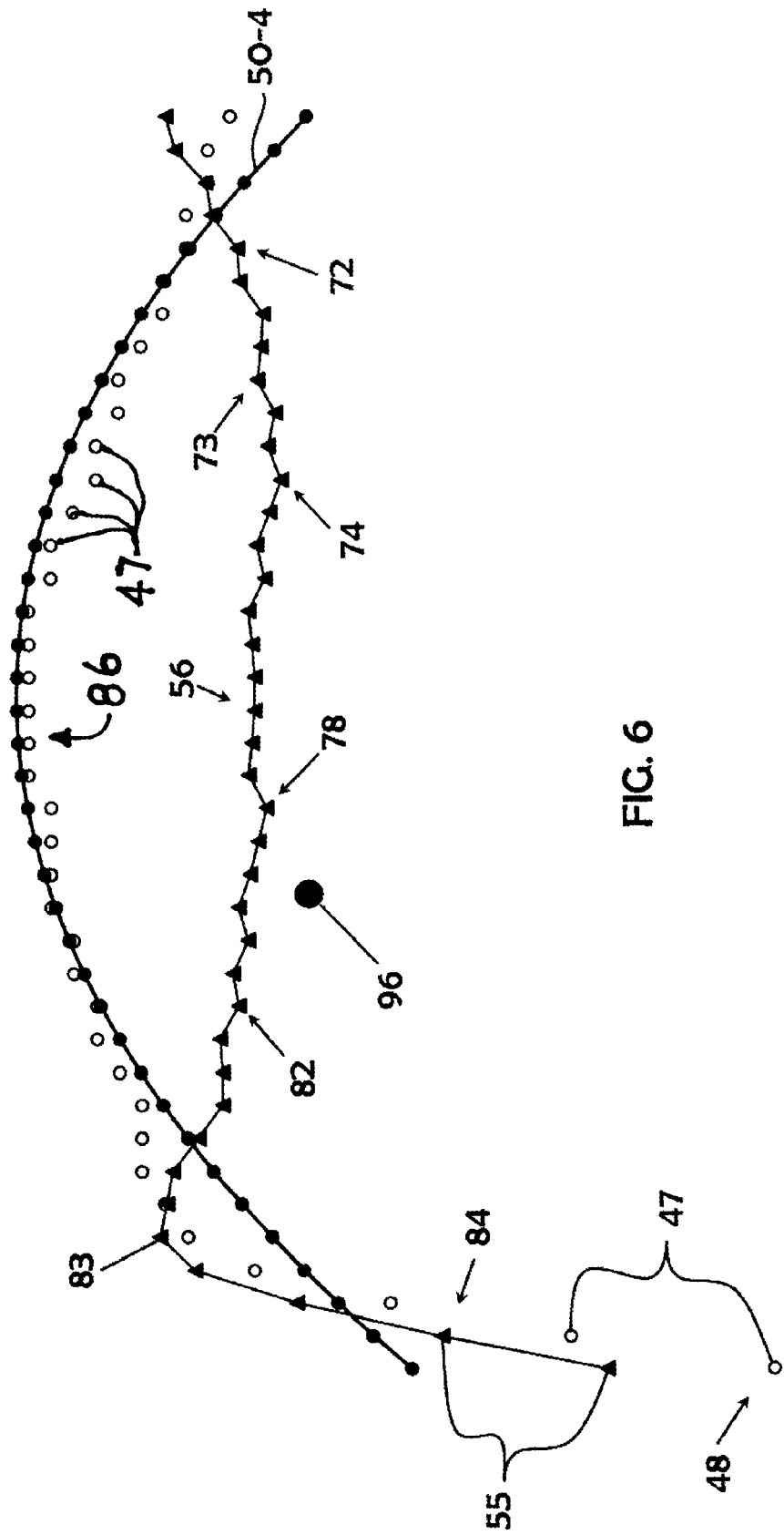
FIG. 6 is a plot of exemplary data points, a parabola derived therefrom, and a line graph of the difference between them.
Figure 7:
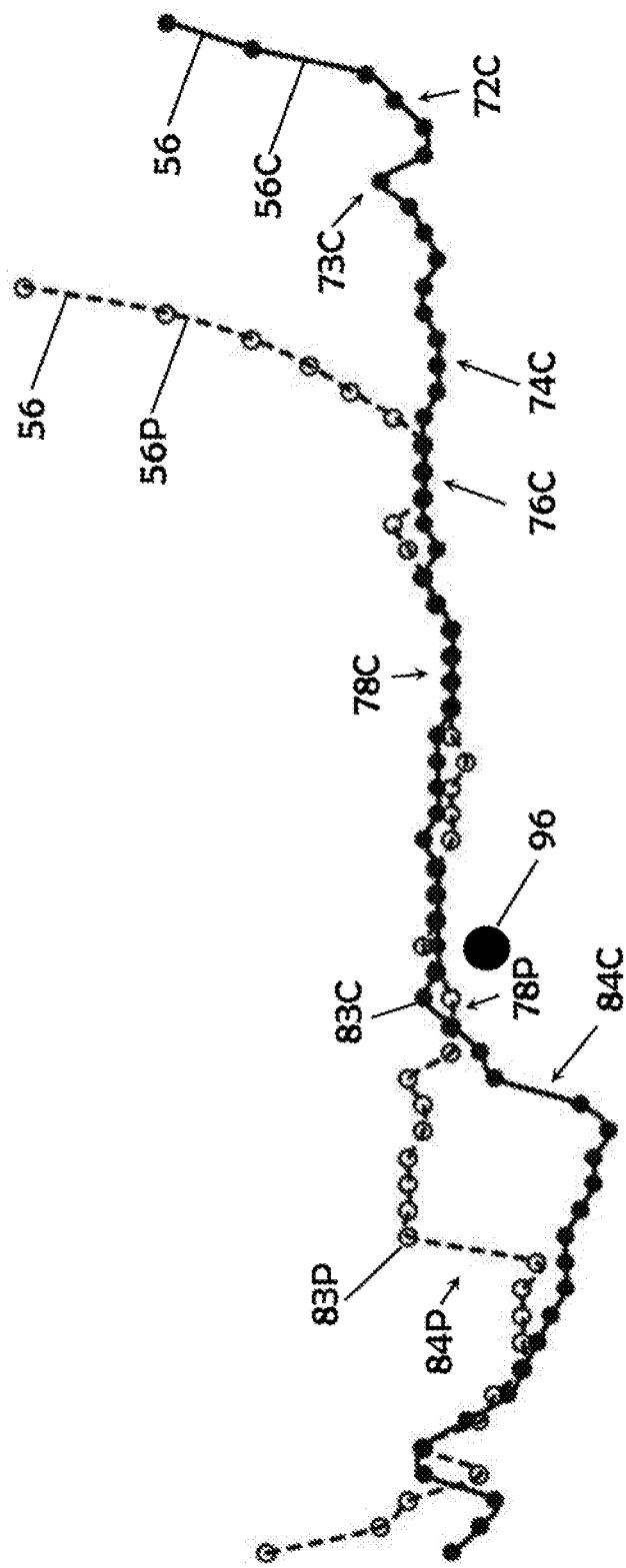
FIG. 7 shows exemplary graphs of a current difference profile and a prior difference profile illustrating the progression over time.

FIGS. 6 and 7 illustrate how, in addition to the valuable feedback and potential alerts provided by production of flight parabolas 50, training system 10 provides real time cuing to jumper 70 to perform an immediate action, such as cuing jumper 70 to kick out, i.e. straighten the legs 81, upon detection by computer 60 that a discernable body part of jumper 70 is at a predetermined time-distance relative to bar 96. To this end, computer 60 has a programmed "kick out" mode wherein the difference 55 between flight parabola 50 and lowest edge 46 is calculated. Difference 55 is the difference between observed lowest line of site obstruction for each vertical array column, i.e., at a given distance in front or back of the center of bar 96, and the value of the extrapolated parabola height value for that column or distance. The totality of differences 55 produces a difference profile 56. From difference profile 56, the location of one or more key body parts and their forward speed is determined.

FIG. 6 is an exemplary plot 48, and line graphs 50-4 and 56 representing a jumper's movement and body form over bar 96. Plot 48 is from data points 47 representing a lowest edge 46 of jumper 70 just after the jumper's buttocks 78 have passed over bar 96. Flight parabola 50-4 is extrapolated from data points 47 as explained with reference to FIG. 3, above. Difference profile 56 may be shown as a line graph of the differences 55 between lowest edge plot 48 and parabola 50-4. Difference profile 56 provides a desired visualization and data of the high jumper's backside 86 including body parts.

Then, by means well known in programming art, the program identifies the pronounced rise and fall features in the difference profile 56 and correlates them with specific backside body parts including head 72, neck 73, upper back 74, lumbar spine 76, buttocks 78, hamstrings 82, knee pits 83, and lower legs 84. The rise or notch for neck 73 and lumbar spine 76 as well as the protrusion or drop of buttocks 78 are more identifiable and may be keyed upon, particularly for calculation of the jumper's speed. Also, notably and of primary importance later in the jump, knee pits 83 and lower legs 84 are readily identifiable.

The program tracks the movement of identifiable body parts of jumper 70 with each sampling and computes therefrom the forward speed of jumper 70. Once the forward speed of jumper 70 is computed from early sampling, then the locations of prior data points 47 of lowest edge 46 from earlier sampling can be extrapolated forward to their expected positions in the formulation of parabola 50.

FIG. 7 shows exemplary graphs of typical difference profiles 56, including a current difference profile 56C and a typical prior difference profile 56P for a jump illustrating the progression over time.

On each difference profile 56P, 56C, identifying the location of jumper's buttocks 78P, 78C, knee pits 83P, 83C, or lower legs 84P, 84C relative to bar 96 is key to generation of a cuing signal for cuing jumper 70. As shown in FIG. 7, the jumper's lower legs 84P, 84C are readily detected as a large and sharp drop in the difference profiles 56P, 56C. In cases where buttocks 78P, 78C are not clearly discernable in difference profile 56, an assumed default distance, such as a typical thigh length or an actual measured length of the thigh of jumper 70, from the readily detectable knee pits 83, may be used to calculate the location of buttocks 78 relative to crossbar 96. Conversely, if knee pits 83 and lower legs 84 are not yet visible, then a default distance from buttocks 78 can be assumed from typical distances or by actual measurement of jumper 70.

For each sampling, from the calculated positions of jumper's 70 body parts and forward speed, the program extrapolates a potential impact time, i.e. the time of expected impact of lower legs 84 with bar 96. A predetermined lead time is subtracted from the impact time to calculate a cuing time for producing a cuing signal. Horn 66 receives the cuing signal and emits an audible cue to jumper 70 to "kick out", i.e. raise lower legs 84 to clear bar 96. The lead time accounts for the time lag between the determination of impact time and time jumper's lower legs 84 will be raised above bar 96. Lead time is primarily reaction time of jumper 79 after hearing the cue and execution time to raise lower legs 84. A commencing estimated lead time may be preprogrammed or may be input by the user. The lead time may be shortened or lengthened by the user in response to observation of reaction time of jumper 70 while jumping. This predictive nature of the algorithm processing allows training system 10 to provide alert cuing with a far more accurate time precision than the algorithm processing frequency, e.g. 10 Hz.

Ideally, the "arch" position in high jump is not attained instantaneously and fully during the jump, but rather the arch onset is ideally increased gradually between the time jumper 70 leaves the ground (not arching at all) and the apex of the jump (arching 100%). A common error for many jumpers 70 is that they arch too "hard" too early in the jump, sometimes arching fully before they have left the ground. By incorporating a complex and variable alerting feature, the exemplary jump training system provides audible cuing for jumper 70, such as an increasing variable tone advancing from low frequency or pitch as jumper 70 leaves the ground (low tone means no arch yet) and increasing during the "rise" of the jump to a high frequency or pitch at the apex of the jump (high tone means full, "hard" arch). By gradually increasing arch effort as the tone increases during the rise of the jump, the jumper's timing for arch onset is trained and improved over time. The variable tone for training arch onset could then be followed by a discrete tone as already described above to cue jumper 70 to kick out of the arch and complete the jump.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention. For example, the described preferred embodiments employ a plurality of optical transmitters and receivers to detect and resolve the monitored jump flight path, a variety of other methods can perform this function including, but not limited to, sonar, radar, LIDAR and stereo video analytics, to name just a few.

In the following claims, the term "light" refers to electromagnetic radiation of any wavelength, whether visible or not.

We claim:

1. A training system for a jumper on a jump path over a crossbar comprising:
   a sensor near the crossbar for sensing the jumper along a direction paralleling the crossbar and for producing a data sample comprising a plurality of data points representative of the lowest edge of the jumper in the vicinity of the crossbar and relative to the crossbar at a data sampling time;
   a computer coupled to said sensor programmed for receiving the data samples at a plurality of data sampling times during the jump and for calculating therefrom: the jumper's forward speed; the location of a jumper's lower leg relative to the crossbar; an expected impact time of the lower leg with the crossbar; and, using a predetermined lead time, a cuing time for producing a cuing signal; and
   a cuing device coupled to said computer for receiving the cuing signal and for cuing the jumper during the jump to raise the lower leg so as to not impact the crossbar.

2. The training system of claim 1 wherein:
   the calculating includes:
      generating, from the plurality of data points of a data sample, an extrapolated flight path for the sensed lowest edge of the jumper as a parabola.

3. The training system of claim 2 wherein:
   the generating includes weighting the data points by a distance factor relative to their distance from the crossbar such that data points for distances farther from the crossbar are given less weight.

4. The training system of claim 3 wherein:
   the generating includes weighting the data points by a time factor such that data points farther back in time are given less weight.

5. The training system of claim 3 wherein:
   the calculating includes producing a difference profile from the difference between the data points and their corresponding values on the generated parabola.

6. The training system of claim 5 wherein:
   the calculating of the jumper's forward speed includes: identifying on a difference profile and a subsequent difference profile the location of a body part of the jumper; observing the distance the identified body part has moved between the profiles; and dividing that distance by the time interval between the productions of the data samples.

7. The training system of claim 5 wherein:
   the calculating of the location of a jumper's lower leg relative to the crossbar includes: identifying on a difference profile the location of the jumper's lower leg or the location of another body part of the jumper from which the distance to the lower leg is known.

8. The training system of claim 5 wherein:
   the calculating of an expected impact time of the lower leg with the crossbar includes:
      figuring the jumper's forward speed by:
         identifying on a difference profile and a subsequent difference profile the location of a body part of the jumper;
         observing the distance the identified body part has moved between profiles; and
         dividing that distance by the time interval between the produced data samples;
      finding the distance of a jumper's lower leg relative to the crossbar by identifying on a difference profile the location of the jumper's lower leg or the location of another body part of the jumper from which the distance to the lower leg can be determined; and
      dividing the distance by the speed.

9. A training method for cuing a jumper on a jump path over a crossbar, said method including the steps of:
   positioning a sensor near the crossbar for sensing the jumper along a direction paralleling the crossbar and for producing a data sample comprising a plurality of data points representative of the lowest edge of the jumper in the vicinity of the crossbar and relative to the crossbar at a data sampling time;
   coupling a computer to the sensor for receiving produced data samples from a plurality of data sampling times;
   programming the computer for repeatedly receiving produced data samples at a plurality of data sampling times during the jump and for calculating therefrom: the jumper's forward speed; the location of a jumper's lower leg relative to the crossbar; an expected impact time of the lower leg with the crossbar; and, using a predetermined lead time, a cuing time for producing a cuing signal;

coupling a cuing device to the computer for receiving the cuing signal and for cuing the jumper during the jump to raise the lower leg so as to not impact the crossbar.

10. The training method of claim 9 wherein:
the calculating includes:
generating, from the plurality of data points of a received data sample, an extrapolated flight path for the sensed lowest edge of the jumper as a parabola.

11. The training method of claim 10 wherein:
the calculating includes:
producing a difference profile from the difference between the data points and their corresponding values on the generated parabola.

12. The training method of claim 11 wherein:
the calculating of the jumper's forward speed includes:
identifying on a difference profile and a subsequent difference profile the location of a body part of the jumper;
observing the distance the identified body part has moved between profiles; and
dividing that distance by the time interval between the productions of the data samples.

13. The training system of claim 11 wherein:
the calculating of an expected impact time of the lower leg with the crossbar includes:
calculating the jumper's forward speed by:
identifying on a difference profile and a subsequent difference profile the location of a body part of the jumper;
observing the distance the identified body part has moved between profiles; and
dividing that distance by the time interval between the produced data samples;
finding the distance of a jumper's lower leg relative to the crossbar by:
identifying on a difference profile the location of the jumper's lower leg or the location of another body part of the jumper from which the distance to the lower leg is known; and
dividing the distance by the speed.

14. The training method of claim 10 wherein:
the generating includes weighting the data points by a distance factor relative to their distance from the crossbar such that data points for distances farther from the crossbar are given less weight; and
the calculating includes:
producing a difference profile from the difference between the data points and their corresponding values on the generated parabola.

15. The training method of claim 10 wherein:
the generating includes weighting the data points by a time factor such that data points farther back in time are given less weight; and
the calculating includes:
producing a difference profile from the difference between the data points and their corresponding values on the generated parabola.

16. The training method of claim 10 wherein:
the generating includes weighting the data points by a distance factor relative to their distance from the crossbar such that data points for distances farther from the crossbar are given less weight; and weighting the data points by a time factor such that data points farther back in time are given less weight; and
the calculating includes:
producing a difference profile from the difference between the data points and their corresponding values on the generated parabola.

17. The training system of claim 4 wherein:
the calculating includes producing a difference profile from the difference between the data points and their corresponding values on the generated parabola.

18. The training system of claim 2 wherein:
the generating includes weighting the data points by a time factor such that data points farther back in time are given less weight.

19. The training system of claim 18 wherein:
the calculating includes producing a difference profile from the difference between the data points and their corresponding values on the generated parabola.

20. The training system of claim 2 wherein:
the calculating includes producing a difference profile from the difference between the data points and their corresponding values on the generated parabola.

* * * * *